Aug. 13, 1929.  P. S. SHIELD  1,724,429
PREDETERMINING AND INDICATING MECHANISM FOR DISPENSERS
Filed Aug. 30, 1926  3 Sheets-Sheet 1

INVENTOR
Paul S. Shield
BY
ATTORNEY

Aug. 13, 1929. P. S. SHIELD 1,724,429
PREDETERMINING AND INDICATING MECHANISM FOR DISPENSERS
Filed Aug. 30, 1926  3 Sheets-Sheet 2

INVENTOR
Paul S. Shield
BY
his ATTORNEY

Patented Aug. 13, 1929.

1,724,429

UNITED STATES PATENT OFFICE.

PAUL S. SHIELD, OF CINCINNATI, OHIO, ASSIGNOR TO AUGUSTINE DAVIS, JR., OF CINCINNATI, OHIO.

PREDETERMINING AND INDICATING MECHANISM FOR DISPENSERS.

Application filed August 30, 1926. Serial No. 132,372.

In liquid dispensers such as are used for supplying measured quantities of motor fuel, it is known to provide a predeterminer which is set by the attendant for the quantity ordered by the customer, the predeterminer being moved backward with the operation of the dispenser until the intended amount has been delivered, whereupon the predeterminer causes the operation of the dispenser to cease. Such predeterminers have been provided with an indicator dial or hand which is turned by the setting movement to show the amount to be delivered, the indicator returning to zero as the liquid is delivered.

An object of this invention is to provide also a customer's dial or indicator which remains stationary while the predeterminer is being set, and which progresses from zero to the amount delivered during the dispensing operation. The object is, further, to provide means whereby, without difficulty, the predeterminer can be reset for a supplementary delivery, in case the customer decides that he wishes more than his original order, and the amount of this supplementary delivery will be added on the customer's indicator to the original delivery, so that, at the conclusion, this indicator shows the total of the amounts delivered. This involves separate and independent connections between means which is operated with the operation of the dispenser, and the predeterminer, on the one hand, and the customer's indicator, on the other hand.

Still another object is to enable the customer's indicator to be readily returned to zero, in such manner that the attendant can not stop the indicator at any point before it reaches zero for the purpose of defrauding a customer in the next delivery. For this purpose a spring or other power element is provided for returning the customer's indicator to zero, together with a device whereby the attendant can release, but not restore, a connection holding the indicator against such action of the spring.

Another object is to provide the dispenser with two customers' indicators visible at opposite sides of the casing, both of which indicators are caused to turn in the same sense, as viewed, that is to say each will be seen to be turning clockwise.

A further general object is to provide a mechanism for accomplishing these purposes, which is of a simple and compact character, adapted for economical manufacture, durable, and reliable in operation.

In the accompanying drawings forming a part hereof.

The invention is not limited to the particular type of measuring dispenser, but has been illustrated in connection with a dispenser having two measuring chambers 2, each of which with its entrance spaces is of accurate unit capacity. A reciprocatory four-way piston and valve 3 alternately reverses the direction of flow to and from these chambers, so that one chamber is filling while the other is emptying, and vice versa. The numeral 4 designates a supply conduit, through which liquid is supplied under suitable moderate pressure, as from a hand-operated pump not shown. 5 is the discharge chamber having a nozzle outlet 6, to which a hose may be connected.

The valve 3 is operated as long as the supply of liquid continues. This may be accomplished by causing a pressure, which develops in each chamber when it becomes filled to act upon the piston valve to initiate a movement thereof to reverse the conditions of flow, the movement of the valve in each direction being taken up in advance of the center point and completed by a snap-over device 7, such as disclosed in my copending application filed August 17, 1926, Serial No. 129,761. Such pressure may be created in the chambers as the result of the closing of float-operated vent valves 8. In this connection it will be noted that the upper corners of the member 3 are cut away at 70 to enable the fluid pressure to act against the end faces of the member.

The valve 3 is therefore representative of a part which has movement in the regular operation of the measuring dispenser. Its movement is transmitted in this instance through an arm 9 connected with the part 3 to a rock-shaft 10, to one end of which the mechanism 7 is connected.

On the other end of said rock-shaft is an arm 11, which oscillates a double-acting pawl carrier 12, the pawls 13 and 14 of which impart rotary movement to a ratchet wheel 15.

The said ratchet wheel 15 is fixed to a hollow rotary shaft 16, which is journaled in the internal frame 17 containing the passages 4 and 5. This shaft may be considered a driver, which is operated with the operation of the dispenser.

Said shaft 16 carries an overhanging arm 18, which contains a radial plunger dog 19 cooperating with a ratchet wheel 20. Said ratchet wheel 20 is fixed to a shaft 21, which passes through the hollow shaft 16. One end of said shaft 21 is direct connected with the hub 22 of an indicator hand 23, which operates over the dial 24 on a cover 25, closing one side of the casing, a glass 26 being provided for the protection of the dial and hand. Said dial and hand constitute a customer's indicator, graduated from zero to the greatest number of gallons or litres which the apparatus is likely to be called upon to deliver, the limit being shown as 20 gallons.

Figure 2:
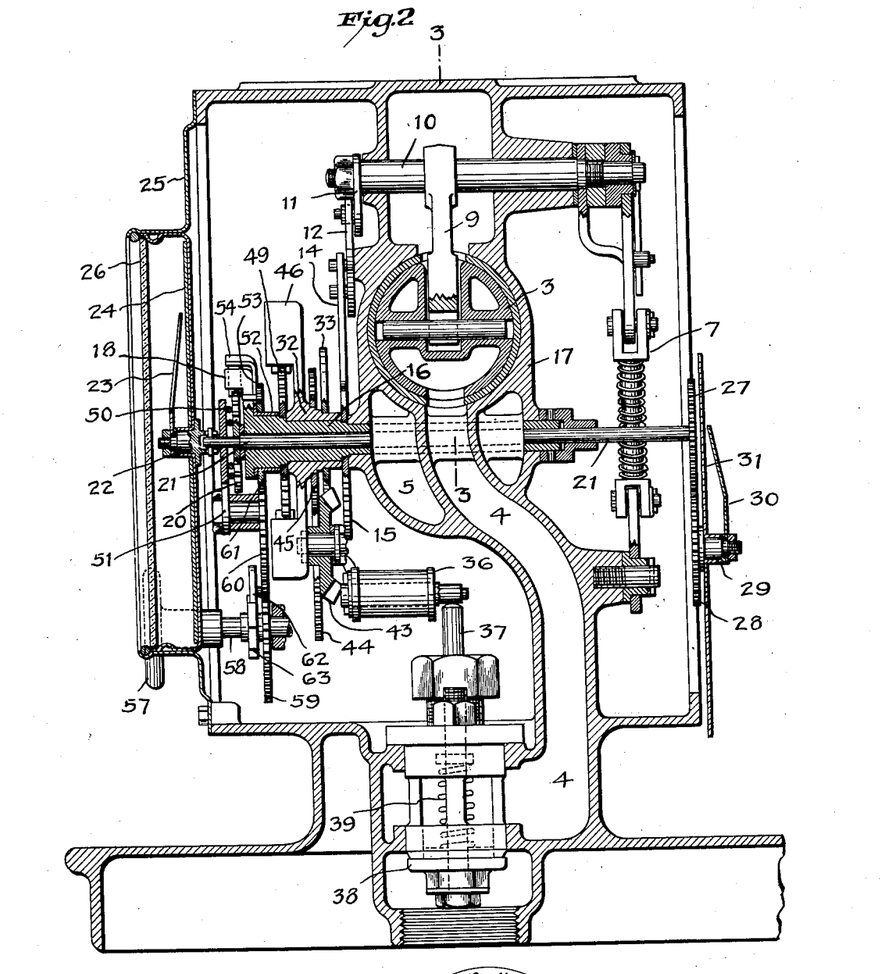
Fig. 2 is a vertical section taken on an irregular line through the general central region of Fig. 1.
Figure 3:
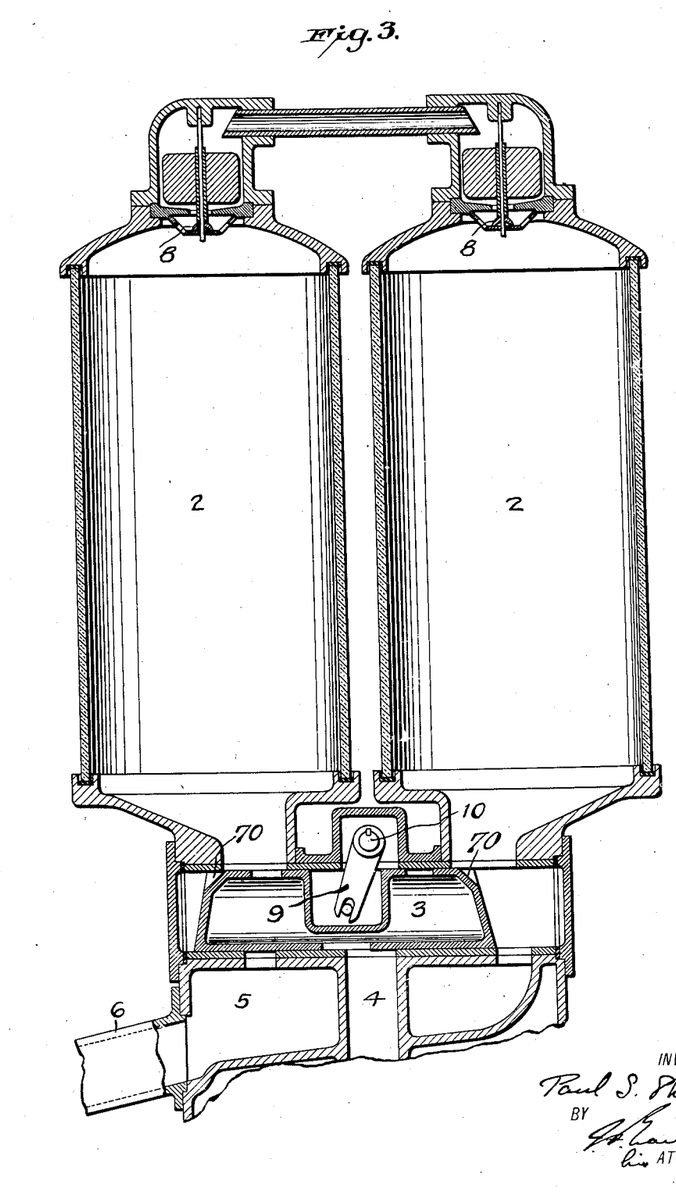
Fig. 3 is a section taken on the line 3—3 of Fig. 2, showing the measuring chambers, which are mounted upon the casing of Figs. 1 and 2.
Figure 4:
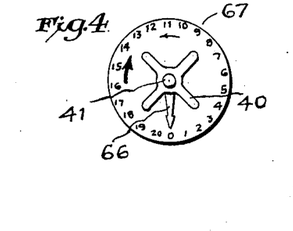
Fig. 4 is a face view of the predeterminer dial, the light arrow showing the direction of setting and the heavy arrow showing the direction in which the predeterminer is turned during the operation of measuring and delivering.

The remote end of the shaft 21, which passes entirely across the casing is connected through two meshing gears 27, 28 with the hub 29 of another hand 30, which operates over the dial 31 of a second customer's indicator, which is visible from the opposite side of the machine. The two customers' indicators are thus driven simultaneously, but reversely, so that each, as viewed, will be seen, during delivery, progressing from zero to the amount delivered in a clockwise direction. For convenience of illustration, the gear 28 has been shown as if beneath the gear 27, with a consequent downward displacement of the hand 30 and the dial 31, though in practice these parts are, of course, disposed in a more suitable manner. For simplicity, the cover plate and glass at the right side of the casing in Fig. 2 have been omitted.

A predetermining sleeve 32 is mounted to turn about the hollow shaft 16, and this sleeve has fixed to it a circular disk 33 containing a peripheral notch 34. This notch cooperates with a roller 35 of an offset bell-crank 36, the other arm of which is arranged to act upon the stem 37 of a valve 38. This valve is urged by a spring 39 to close the supply passage 4, and is therefore an embodiment of a master element, the function of which is to render inoperative, or stop the operation of, the dispenser when a predetermined quantity has been delivered. When the roller 35 rests in the notch 34, the valve is closed, but when the disk 33 is turned to cam the roller out of the notch and to sustain it on the circular periphery, the valve is forced open and the dispenser can then be operated. The distance to which the disk 33 is turned relative to the hollow shaft 16 determines the quantity which will be delivered before the valve 38 closes.

The predeterminer sleeve 32 and its disk 33 are turned, for setting, by an attendant's handle 40 outside the casing upon a shaft 41, which carries a bevel pinion 42, which meshes a bevel gear 43, this bevel gear being united with a spur gear 44 which meshes a gear wheel 45 fixed to the sleeve 32.

When the dispenser is thereafter operated, the predeterminer disk 33 is turned backward until eventually the roller 35 drops into the notch 34. For this purpose the sleeve 32 is provided with one or more overhanging arms 46 containing radial plunger dogs 47, which are urged inward by springs 48. These dogs cooperate with a ratchet wheel 49, which is fixed to the operating shaft 16. A connection is thus provided which enables the predeterminer disk 33 to be turned in the direction of the light arrow of Fig. 1 for setting it relatively to the rotary member 16, which is then stationary. When, however, the part 3 starts in motion with the measuring and delivering operation of the dispenser, the rotation of the member 16 through the agency of the pawls 13, 14 and the ratchet wheel 15 will turn the predeterminer backward in the direction of the heavy arrow.

A spring 50 is connected to the ratchet wheel 20, its other end being anchored to a fixed part 51, so that as the customers' indicators are turned during the dispensing operation the tension of this spring constantly tends to return these indicators to zero, and will do so when the driving connection between the members 16 and the indicators is released. In order to release this connection a sleeve 52 is mounted to turn about the member 16, and carries an arm 53 having a flange 54, which overhangs the outer end of the dog 19. This flange is inclined at 55, so as to have a camming action on the dog, which when it is under the low portion of the flange is locked in driving engagement with the ratchet wheel 20. If, however, the arm 53 be turned in a clockwise direction in Fig. 1, the low portion of the flange 54 will be moved away from the outer end of the dog 19, which in consequence will be repelled by the inclined faces of the teeth of the ratchet wheel 20 urged by the spring 50. This spring is strong enough to overcome the spring 56 of the dog, and consequently quickly turns the ratchet wheel 20 relatively to the dog in the direction to return the indicator hands 23 and 30 to zero.

The arm 53 can be operated for this purpose by a handle 57 outside the casing on a shaft 58 bearing a gear-wheel 59 which meshes an idler gear 60, which in turn meshes a gear 61 fixed to the sleeve 52. A pawl and ratchet connection 62, 63 permits the handle 57 to turn the arm 53 in a clockwise direction in Fig. 1, but not in the reverse direction. The driving connection between the indicator shaft 21 and the driver 16 will not be restored until this driver starts to turn at the next dispensing operation. Then the dog 19 is at once forced against the incline of the flange 53 so as to lock the dog in driving engagement with the ratchet 20. The flanged arm 53 thus constitutes a passive element through the co-operation of which the driving connection is automatically restored. It is impossible, however, for the operator to restore the connection and hold the customers' indicator hands at any point before they return all the way to zero.

Figure 1:
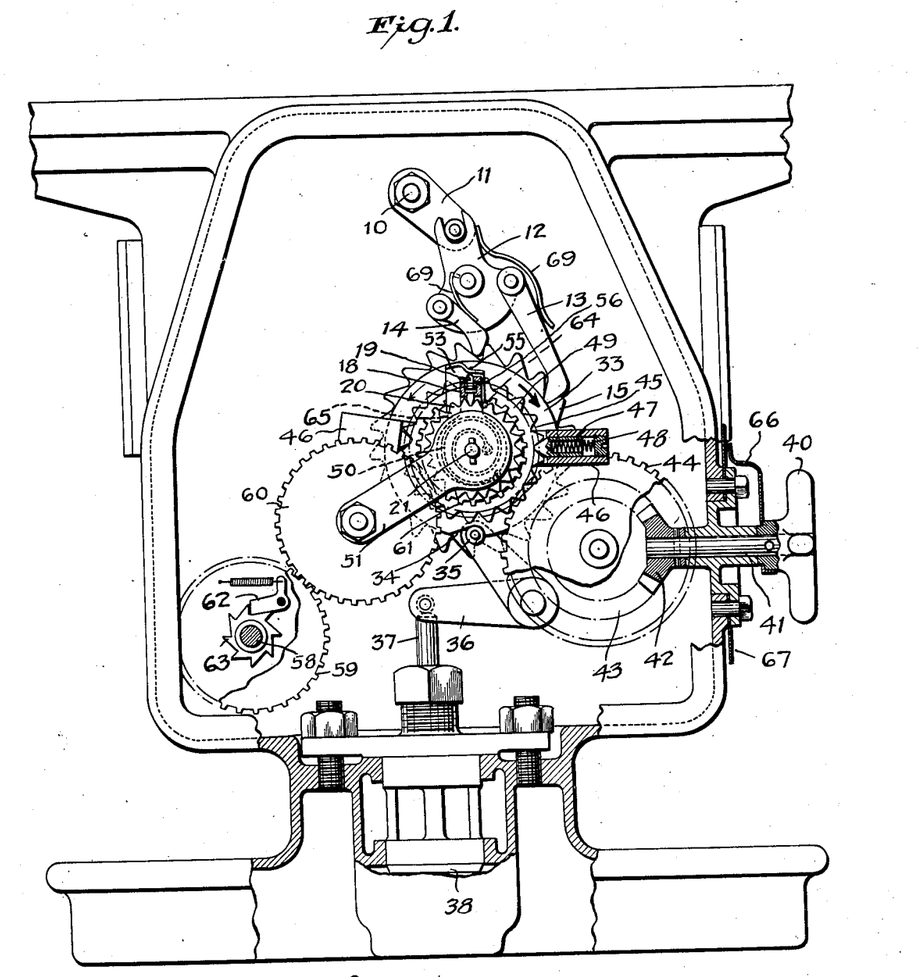
Fig. 1 is a front elevation of the predetermining and indicating mechanism within the case of the dispenser, the cover plate and customer's indicator being removed and certain parts being broken away and sectioned.

At the commencement of a dispensing operation, the friction between the sleeve 52 and the driver 16 and in the train of gearing 59, 60 and 61 is sufficient to hold the arm 53 momentarily stationary while the initial movement of the arm 18 urges the dog 19 beneath the incline 55 of the flange. Thereafter the arm 53 is propelled by the arm 18, so that the relative positions shown in Fig 1 are preserved throughout the dispensing operation. This propulsion of the arm 53 results from the provision of a pin 64 placed on the gear wheel 61 in a position to be contacted by the right-hand edge of the arm 18. Another pin 65 on the gear 61 is adapted to contact with the left-hand edge of the arm 18, so as to limit the clockwise movement of the arm 53 which may be effected by the handle 57 to release the driving connection, the distance between the two pins 64 and 65 being somewhat greater than the width of the arm 18.

The predeterminer is provided with an indicator for the guidance of the attendant. This indicator may consist of a hand 66 on the hub of the knob 40, to operate over a dial 67, which is marked with the same division as the customers' dials 24 and 31.

Figure 5:
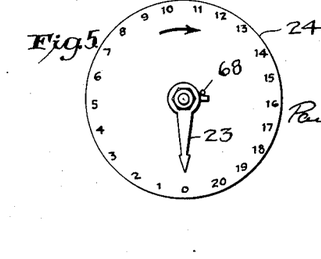
Fig. 5 is a face view of one of the customer's indicators, the heavy arrow showing the direction in which it is moved during the measuring and delivering operation.
Figure 6:
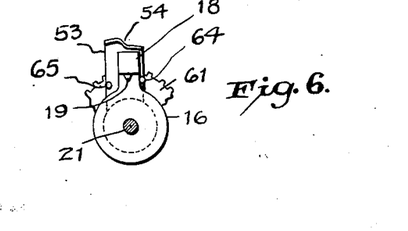
Fig. 6 is a detail view of a portion of the mechanism.

A stop for arresting the customers' indicators when they return to zero is shown at 68 in Fig. 5.

The operation will be briefly described. Let it be assumed that the customer orders ten gallons. The attendant turns the knob 40 until the hand 66 points to "10" on the dial 67. This turns the predeterminer disk 33 a corresponding distance in the direction of the light arrow in Fig. 1, carrying the notch 34 away from the roller 35 and opening the master valve 38. The dispenser is now set in operation by manually pumping the liquid through the conduit 4, or otherwise, this operation causing the rock-shaft 10 to oscillate, and through the double-acting pawl and ratchet 13, 14, 15 advancing the member 16 at each stroke of the part 3. The connection or clutch 46, 47, 48, 49, which in the setting operation yielded to permit the turning of the predeterminer, now acts to rotate, or in some cases might act to permit the rotation of, the predeterminer disk 33 in the direction of the heavy arrow, the springs 48 in the case of a driving connection being strong enough for the purpose. Coincident with this movement of the predeterminer the hand 66 of the predeterminer indicator turns clockwise toward zero. The rotation of the driver 16 also turns the customers' indicator hands 23 and 30, causing them to progress clockwise from zero toward the amount to be delivered. When the quantity has been delivered, the roller 35 of the bell-crank 36 enters the notch 34, permitting the valve 38 to close, so that no more liquid will be delivered.

The mechanism is now at rest, with the attendant's indicator 66, 67 at zero and the customers' indicators 23, 24 and 30, 31 showing the amount that has been delivered, that is to say, in the supposed instance, ten gallons. If the transaction is closed, the attendant then gives the knob 57 a slight turn, so as to shift the arm 53 to release the connection between the cooperating elements comprising the ratchet wheel 20 and the arm 18 with its dog 19. The customers' indicators are then returned to zero by the action of the spring 50, and, as previously explained, it is impossible for the attendant to stop the customers' indicators at any point short of zero so as to defraud another customer.

It frequently happens, however, that a customer finds that his tank has not been sufficiently filled with the amount ordered and asks for a supplementary amount. This could be done after returning the customers' indicators to zero, by resetting the predeterminer to deliver two gallons, but at the end of the transaction the customers' indicators would show only two gallons, which might lead to dispute, and there would have been an unnecessary operation in returning the customers' indicators to zero. It is an advantageous feature of this mechanism that it permits a supplementary quantity to be delivered, and this quantity to be added on the customer's indicator, so that at the conclusion the total amount will be shown thereon. Therefore, if the customer asks for an additional quantity, the attendant will not operate the knob 57 at the conclusion of the original delivery, but will leave the customers' indicators at ten gallons, let us say. He resets the predeterminer from zero to two gallons, or whatever the additional quantity may be, and then again operates the dispenser. In so doing the customers' indicators are caused to progress from ten to twelve, or other total amount, whereupon the operation of the dispenser is again stopped.

The pawls 13 and 14 may be provided with springs 69, strong enough to keep the ratchet wheel 15 from being dragged forward in case the attendant, after turning the knob 40 in the setting direction, should turn it back a distance. If the ratchet wheel 15 were not held against being dragged at such a time, the customers' indicators would be advanced a distance before the dispensing operation began, and it would thus be possible to cheat the customers. Manifestly, this could also be avoided by interposing a one-way acting clutch between the knob 40 and the sleeve 32, so that the attendant could turn the predeterminer only in the normal setting direction.

While the preferred embodiment of the invention has been described in detail, it will be understood that numerous changes in details of construction and operation may be made without departing from essentials.

I claim:

1. In a measuring dispenser having a master element for rendering the dispenser inoperative when a predetermined quantity has been delivered,—a predetermining and indicating mechanism comprising the combination of operating means which is operated with the operation of the dispenser, a predeterminer controlling said master element, a connection between said predeterminer and said operating means whereby the predeterminer can be set by movement relative to said means and whereby the predeterminer moves backward with the movement of said means, a customer's indicator which progresses from zero to the quantity delivered, and a connection through which said customer's indicator is driven and which includes a means of disconnection enabling said indicator to be returned to zero prior to the next operation of the dispenser, the connections being such that the predeterminer can be set for the delivery of an additional quantity while the customer's indicator remains at the amount originally predetermined and delivered, the further operation of the dispenser causing the customer's indicator to progress to the total amount.

2. In a measuring dispenser having a master element for rendering the dispenser inoperative when a predetermined quantity has been delivered,—a predetermining and indicating mechanism comprising the combination of operating means which is operated with the operation of the dispenser, a predeterminer controlling said master element, a connection between said predeterminer and said operating means whereby the predeterminer can be set by movement relative to said means and whereby the predeterminer moves backward with the movement of said means, a customer's indicator which progresses from zero to the quantity delivered, a connection through which said customer's indicator is driven and which includes a means of disconnection enabling said indicator to be returned to zero, and a power element for returning the customer's indicator to zero when the last-named driving connection is released, the connections being such that the predeterminer can be set for the delivery of an additional quantity while the customer's indicator remains at the amount originally predetermined and delivered, the further operation of the dispenser causing the customer's indicator to progress to the total amount.

3. In a measuring dispenser having a master element for rendering the dispenser inoperative when a predetermined quantity has been delivered,—a predetermining and indicating mechanism comprising the combination of operating means which is operated with the operation of the dispenser, a predeterminer controlling said master element, a connection between said predeterminer and said operating means whereby the predeterminer can be set by movement relative to said means and whereby the predeterminer moves backward with the movement of said means, a customer's indicator which progresses from zero to the quantity delivered, a connection through which said customer's indicator is driven and which includes a means of disconnection enabling said indicator to be returned to zero, a power element for returning the customer's indicator to zero when the last-named connection is released, and means for releasing said connection and preventing arrest of the customer's indicator before returning all the way to zero, the connections being such that the predeterminer can be set for the delivery of an additional quantity while the customer's indicator remains at the amount originally predetermined and delivered, the further operation of the dispenser causing the customer's indicator to progress to the total amount.

4. In a measuring dispenser having a master element for rendering the dispenser inoperative when a predetermined quantity has been delivered,—a predetermining and indicating mechanism comprising the combination of operating means which is operated with the operation of the dispenser, a predeterminer controlling master element, a connection between said predeterminer and said operating means whereby the predeterminer can be set by movement relative to said means and whereby the predeterminer moves backward with the movement of said means, a customer's indicator which progresses from zero to the quantity delivered, a connection through which said customer's indicator is driven and which enables the same to be returned to zero, a power element for returning the customer's indicator to zero when the last-named connection is released, and means for releasing said driving connection and whereby the said connection is restored only by the next operation of said operating means, the connections being such that the predeterminer can be set for the delivery of an additional quantity while the customer's indicator remains at the amount originally predetermined and delivered, the further operation of the dispenser causing the customer's indicator to progress to the total amount.

5. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, a third element arranged to turn about the same axis as said driving elements, and attendant's means for operating said third element to release the driving connection between the driving elements.

6. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, a passive element through the cooperation of which driving connection between said driving elements is automatically obtained when said driver starts to turn, and means enabling the attendant to operate said passive element only in a manner to release the driving connection.

7. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, a camming element through the cooperation of which driving connection between said driving elements is obtained, and means enabling the attendant to operate said camming element in a manner to release the driving connection.

8. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, one of said elements comprising a dog and the other elements being a ratchet wheel the teeth of which are adapted to repel said dog when said indicator is returned to zero by said power element, an element adapted to lock said dog in driving engagement with said ratchet wheel, and means enabling the attendant to operate said locking element only in a manner to release the driving connection.

9. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, one of said elements comprising a dog and the other element being a ratchet wheel the teeth of which are adapted to repel said dog when said indicator is returned to zero by said power element, an element through the cooperation of which said dog is automatically locked in engagement with said ratchet wheel when said driver starts to turn, and means enabling the attendant to release but not restore the lock.

10. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, one of said elements comprising a dog and the other element being a ratchet wheel the teeth of which are adapted to repel said dog when said indicator is returned to zero by said power element, a passive camming element through the cooperation of which said dog is automatically locked in engagement with said ratchet wheel when said driver starts to turn, and means enabling the attendant to control said passive element to release but not to restore the lock.

11. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, a third cooperating element mounted to turn about the same axis as said driving elements and capable of turning relatively thereto, means whereby said third element is propelled by one of the driving elements, an attendant's handle and connections between the same and said third element including a one-way acting connection whereby the attendant can operate said third element to release the connection between said driving elements.

12. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, a third cooperating element mounted to turn about the same axis as said driving elements and capable of turning relatively thereto, means whereby said third element is propelled by one of the driving elements, gearing connected with said third element and terminating in an attendant's handle, and a one-way acting connection between said handle and said third element enabling the attendant to operate said element only in a manner to release the connection between said driving elements.

13. In a dispenser having measuring means, and a master element for rendering the dispenser inoperative when a predetermined quantity has been delivered,—a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, a passive element mounted to turn about the same axis as said driving elements and capable of turning relatively thereto, means limiting the movement of said passive element relative to one of said driving elements, and means enabling the attendant to operate said passive element only in a manner to release the driving connection.

14. In a dispenser having measuring means, and a master element for rendering the dispenser inoperative when a predetermined quantity has been delivered,— a predetermining and indicating mechanism comprising the combination of a rotary driver which is operated with the operation of the dispenser, an indicator which progresses from zero to the quantity delivered, a power element for returning said indicator to zero, two cooperative elements through which said indicator is driven from said driver, one of said elements comprising a dog and the other element being a ratchet wheel the teeth of which are adapted to repel said dog when said indicator is returned to zero by said power element, a passive element mounted to turn about the same axis as said driving elements and having a camming flange to cooperate with said dog so as to lock the latter in driving engagement with the ratchet wheel, and means enabling the attendant to operate said passive element only in a manner to release the lock.

15. A predetermining and indicating mechanism for a dispenser, comprising driving means, a predeterminer, a connection between said predeterminer and said driving means enabling the predeterminer to be moved relatively to the driving means for setting, and causing said predeterminer to be driven by said driving means, an indicator adapted to progress to the amount delivered, a separate driving connection between said indicator and said driving means, said connection including a means of disconnection, and means for returning said indicator to normal position.

16. A predetermining and indicating mechanism for a dispenser, comprising a rotary driver, a rotary predeterminer coaxial with said driver, a connection between said predeterminer and said driver enabling the pedeterminer to be moved relatively to the driver for setting, and causing the predeterminer to be driven backward by the driver, a rotary customer's indicator coaxial with said driver and predeterminer, and a separate disconnectible connection whereby said customer's indicator is driven by said driver and enabling said indicator to be returned to zero.

17. A predetermining and indicating mechanism for a dispenser, comprising a hollow rotary driver which is operated with the operation of the dispenser, a predeterminer having ratchet connection with said driver, an inner shaft passing through said driver, customers' indicators connected with both outer portions of said inner shaft, and a connection between said inner shaft and said driver whereby both said indicators are driven by the driver and enabling said indicators to be returned simultaneously to zero.

18. A predetermining and indicating mechanism for a dispenser, comprising a casing, driving means therein which is operated with the operation of the dispenser, a horizontal rotary driven shaft in the casing, indicators at opposite sides of the casing which progress from zero to the amount delivered, the connections between said indicators and said shaft being of a reverse nature causing said indicators to be driven each in the same sense as viewed, and a connection between said shaft and said driving means whereby both indicators are driven and can be simultaneously returned to zero.

19. In a measuring dispenser, the combination with twin measuring chambers, passages and valve means for causing one of said chambers to fill while the other is emptying alternately, of a master valve in a supply passage to said chambers, operating means which is operated with the operation of said valve means, a predeterminer controlling said master valve and controlled by said operating means, means for setting the predeterminer by movement relative to said operating means, an indicator connected with the predeterminer, and a customer's indicator having connection with the operating means, the operation of said means causing the customer's indicator to progress from zero to the amount delivered while the predeterminer indicator retrogresses.

20. In a dispenser, the combination of operating means which is operated with the operation of the dispenser, a predeterminer which stops the operation of the dispenser when a predetermined quantity has been delivered, said predeterminer being adapted to be set by movement relative to the operating means and to be controlled thereby, a customer's indicator, a spring for returning said indicator to normal position, a connection between said indicator and the operating means, and means whereby the attendant can release but not restore said connection so as to stop the indicator before returning all the way to the normal position.

21. In a measuring dispenser, the combination with twin measuring chambers, passages and valve means for causing one of said chambers to fill while the other is emptying alternately, of a master valve in a supply passage to said chambers, operating means which is operated with the operation of said valve means, a predeterminer controlling said master valve, a connection between said predeterminer and said operating means whereby the predeterminer can be set by movement relative to said means and whereby the predeterminer moves backward with the movement of said means, a customer's indicator which progresses from zero to the quantity delivered, and a connection through which said customer's indicator is driven and which includes a means of disconnection enabling said indicator to be returned to zero prior to the next operation of the dispenser, the connections being such that the predeterminer can be set for the delivery of an additional quantity while the customer's indicator remains at the amount originally predetermined and delivered, the further operation of the dispenser causing the customer's indicator to progress to the total amount.

22. In a measuring dispenser, the combination with twin measuring chambers, passages and valve means for causing one of said chambers to fill while the other is emptying alternately, of a master valve in a supply passage to said chambers, operating means which is operated with the operation of said valve means, a predeterminer controlling said master valve, a connection between said predeterminer and said operating means whereby the predeterminer can be set by movement relative to said means and whereby the predeterminer moves backward with the movement of said means, a customer's indicator which progresses from zero to the quantity delivered, a connection through which said customer's indicator is driven and which includes a means of disconnection enabling said indicator to be returned to zero, and a power element for returning the customer's indicator to zero when the last-named driving connection is released, the connections being such that the predeterminer can be set for the delivery of an additional quantity while the customer's indicator remains at the amount originally predetermined and delivered, the further operation of the dispenser causing the customer's indicator to progress to the total amount.

23. In a measuring dispenser, the combination with twin measuring chambers, passages and valve means for causing one of said chambers to fill while the other is emptying alternately, of a master valve in a supply passage to said chambers, operating means which is operated with the operation of said valve means, a predeterminer controlling said master valve, a connection through which said customer's indicator is driven and which includes a means of disconnection enabling said indicator to be returned to zero, a power element for returning the customer's indicator to zero when the last-named connection is released, and means for releasing said connection and preventing arrest of the customer's indicator before returning all the way to zero, the connections being such that the predeterminer can be set for the delivery of an additional quantity while the customer's indicator remains at the amount originally predetermined and delivered, the further operation of the dispenser causing the customer's indicator to progress to the total amount.

PAUL S. SHIELD.